United States Patent [19]

Watanabe et al.

[11] Patent Number: 4,622,583
[45] Date of Patent: Nov. 11, 1986

[54] AUDIENCE RATING MEASURING SYSTEM

[75] Inventors: Fumio Watanabe, Zama; Yoshikazu Itoh, Kunitachi, both of Japan

[73] Assignee: Video Research Limited, Tokyo, Japan

[21] Appl. No.: 682,104

[22] Filed: Dec. 17, 1984

[30] Foreign Application Priority Data

Jul. 10, 1984 [JP] Japan .................. 59-143052

[51] Int. Cl.$^4$ ............ H04N 17/04; H04N 17/06; H04H 9/00
[52] U.S. Cl. ........................... 358/84; 455/2
[58] Field of Search .............. 179/2 AS; 358/84; 455/2

[56] References Cited

U.S. PATENT DOCUMENTS 3,803,349 4/1974 Watanabe .................. 358/84
4,230,990 10/1980 Lert, Jr. et al. ........... 358/84 X
4,511,917 4/1985 Köhler et al. .................. 358/84
4,546,382 10/1985 McKenna et al. .......... 179/2 AS X
4,574,304 3/1986 Watanabe et al. .......... 358/84

FOREIGN PATENT DOCUMENTS 2138642 10/1984 United Kingdom .................. 358/84

Primary Examiner—Keith E. George
Attorney, Agent, or Firm—Roberts, Spiecens & Cohen

[57] ABSTRACT

A system which detects the operation of a video tape recorder to obtain data related to the operation of the video tape recorder. The system is also capable of determining the dubbing condition of the video tape recorder over the recording of an ordinary broadcast. The system further determines the receiving channel of the video tape recorder or the television set by directly comparing video signals.

2 Claims, 10 Drawing Figures

AUDIENCE RATING MEASURING SYSTEM

BACKGROUND OF THE INVENTION

1. Field of the Invention

The present invention relates to an audience rating measuring system.

2. Description of the Prior Art

To measure TV audience rating, there has previously been used a measuring instrument called a videometer, which records the time at which the power source of a television set is turned on or off, the channels viewed, and the like on a paper tape or memory device.

In recent years, however, video tape recorders for domestic use have been so widely used that it is becoming difficult to measure the audience rating with conventional audience rating measuring systems. That is to say, when the television set is simply used without accessory components, the content which the audience is viewing is a program which is being broadcast. Therefore, the condition of viewing can be correctly recorded relying simply upon the data related to turning on or off of the power source of the television set and the channel being viewed. With the television set being used in combination with a video tape recorder, however, there exists a variety of possibilities for viewing programs. For instance, the audience any record a program without really viewing the program at the time the program is being broadcast, and may view the program at a later time by playing back the recorded contents.

The measuring instrument (such as the videometer mentioned above) has the function of recording the data related to a television program that is being viewed in real time, but is not capable of obtaining data related to the use of video tape recorders.

SUMMARY OF THE INVENTION

The present invention was proposed in view of the above-mentioned type of problem, and one of its objects is to provide an audience rating measuring system which is capable of obtaining data related to the operation of a video tape recorder, by detecting the operation conditions of the video tape recorder.

Another object of the present invention is to provide an audience rating measuring system which is capable of determining dubbing conditions that should not be neglected in using a video tape recorder over the recording of an ordinary program broadcast.

A further object of the present invention is to provide an audience rating measuring system which is capable of determining the channel being received by a video tape recorder or television set by directly comparing the video signals.

DESCRIPTION OF THE PREFERRED EMBODIMENTS

Figure 1:
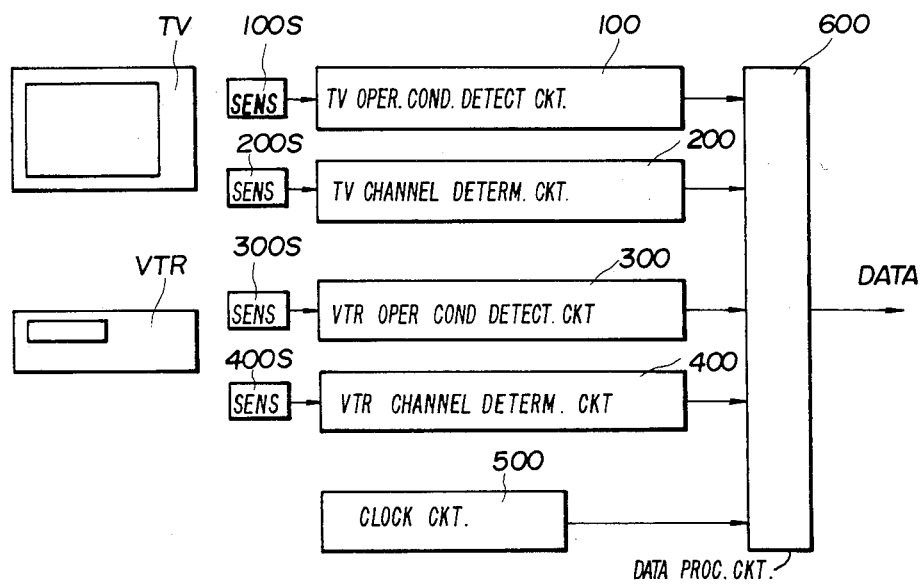
FIG. 1 is a block diagram showing a circuit for detecting data in an audience rating measuring system in accordance with the invention.

FIG. 1 shows the complete structure and circuit of an audience rating measuring system for detecting the data to which the present invention is adapted. Namely, FIG. 1 shows the fundamental structure for detecting data when a television set TV and a video tape recorder VTR are combined together. This structure chiefly consists of a television set operation condition (on or off) detector circuit 100, a television channel determining circuit 200, a video tape recorder operation condition detector circuit 300, a video tape recorder channel determining circuit 400, a clock circuit 500, and a data processor circuit 600. Sensors 100S, 200S, 300S and 400S are provided in the television set TV, in the video tape recorder VTR, or on the power source lines. When the number of television sets TV or video tape recorders VTR is increased, the number of the above-mentioned circuits should be increased as required.

The present invention provides a concrete structure of the video tape recorder operation condition detector circuit 300 in the above-mentioned system.

First, it has been known that the operation condition of the video tape recorder can be roughly divided into the following four modes:

(1) Off mode,
(2) Monitor mode,
(3) Play-back mode, and
(4) Recording mode.

The off mode stands for a state where the power source of the video tape recorder is turned off, the monitor mode stands for a state where a program is viewed on a screen of the television set through the tuner of the video tape recorder, the play-back mode stands for a state where a tape recording of the picture is being played back, and the recording mode stands for a state where a program being broadcast is recorded.

The applicant has already proposed means for determining the operation mode of the video tape recorder in Japanese Patent Application No. 71221/1983 entitled "System for Detecting Operation Condition of the Video Tape Recorder in an Audience Rating Measuring System". According to the above application, turning on and off of the power source, as well as operation of the mechanical portions such as electric motors, are detected depending upon the intensity of electric current that flows into the power source circuit of the video tape recorder. Further, logic operation is carried out using erase signals generated at the time of recording the program in the video tape recorder, and using a turn-on or turn-off detection signal of the television set, in order to determine the operation mode of the video tape recorder. These operations are tabulated below.

| Mode | VTR | TV | Mechanical portion | Erase signal |
| --- | --- | --- | --- | --- |
| Off | off | off | off | off |
| Monitor | on | on | off | off |
| Play-back | on | on | on | off |
| Recording | on | on/off | on | on |

These modes are determined by the logical correspondence based upon the on or off condition of the power source of the video tape recorder VTR, on or off condition of power source of the television set TV, on or off of the mechanical portion of the video tape recorder, and the presence or absence (on or off) of the erase signal.

According to the above system, however, many detection signals are needed to determine the modes. Thus, the sensors and the processor circuit tend to become complex. In particular, with regard to the sensors for detecting the turning on or off of the power source and the turning on or off of the mechanical portion relying upon the change in power source current of the video tape recorder, it is not possible to make uniform the threshold level for electric current, since power source circuits are differently constructed depending upon the manufacturers or the models, and inconvenience is always involved in designing the system or at the time of adjustment when actually connecting the units.

According to the present invention, therefore, attention is given to frequency-modulated video signals that are to be written onto the tape and that are generated in the recording circuit and in the play-back circuit of the video tape recorder, in order to determine the recording mode and the play-back mode relying upon the presence or absence of these signals.

Figure 2:
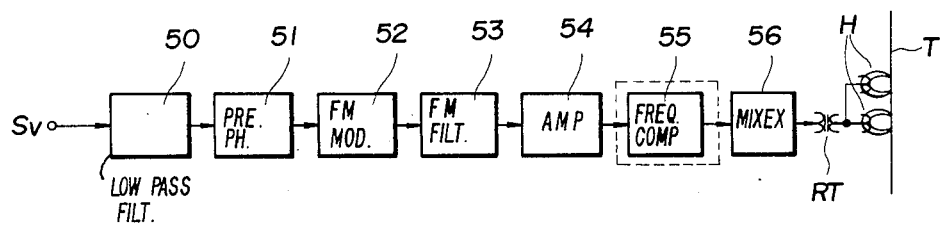
FIG. 2 is a block diagram showing the circuit of a recording circuit in a general video tape recorder.
Figure 3:
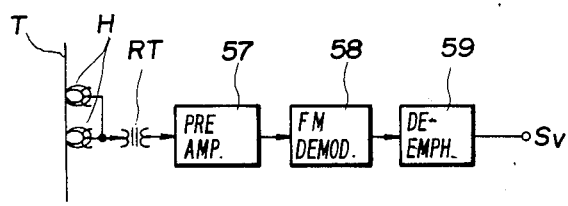
FIG. 3 is a block diagram showing the circuit of a play-back circuit in a general video tape recorder.

FIGS. 2 and 3 illustrate a recording circuit and a play-back circuit in a general video tape recorder. In the recording circuit, the video signal (brightness signals) Sv pass through a low-pass filter 50 and a pre-emphasis circuit 51, are converted into frequency-modulated signals through an FM modulator 52, applied to a head H via an FM filter 53, a recording amplifier 54, a frequency compensation circuit 55, a mixer 56 and a rotary transformer RT, and are recorded onto a magnetic tape T. In the play-back circuit, the signals picked up by the head H from the magnetic tape T are amplified through a preamplifier 57, and are passed through an FM demodulator 58, and a de-emphasis circuit 59 to obtain video signals Sv. Therefore, by providing pick-up coils close to these circuits, it is possible to detect frequency-modulated video signals (hereinafter referred to as FM brightness signals), and to determine the recording mode or the play-back mode relying upon the presence or absence of such signals.

Figure 4:
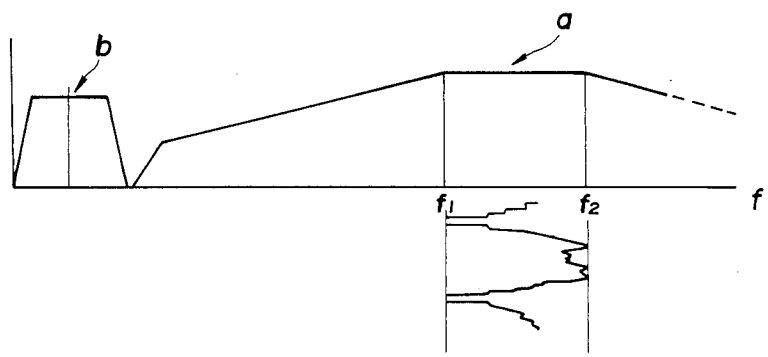
FIG. 4 is a spectrum diagram of signals recorded onto a magnetic tape.

FIG. 4 shows a frequency spectrum of a signal recorded on the magnetic tape T, wherein symbol a denotes the above-mentioned FM brightness signal, and b denotes a color subcarrier wave. The central frequency of the FM brightness signals exist at around 4 MHz. Here, $f_1$ corresponds to a sink-chip level of the brightness signals, $f_2$ corresponds to a white level, and the brightness signals vibrate therebetween. Therefore, the FM brightness signal a describes a spectrum of which the side-band wave is widely spread towards the right and left. The values of $f_1$ to $f_2$ range from 3.4 to 4.4 MHz in the case of the VHS system, and from 3.6 to 4.8 MHz in the case of the beta system.

Figure 5:
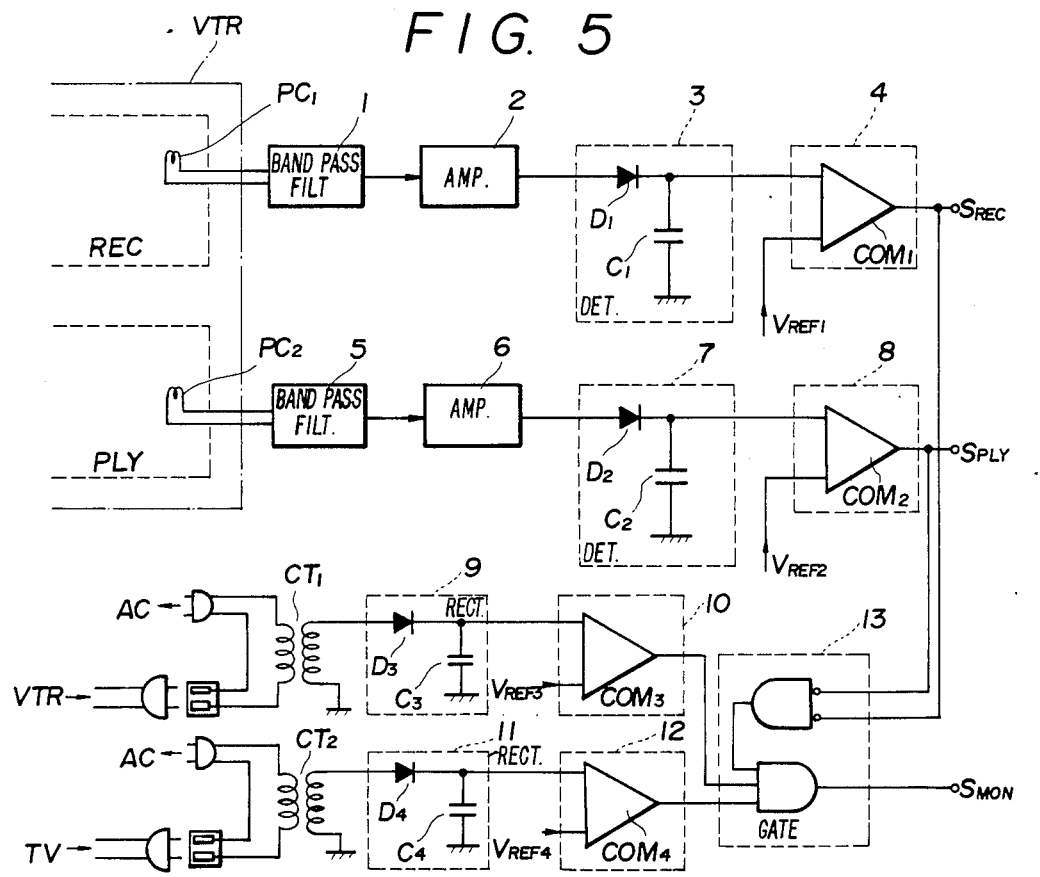
FIGS. 5 and 6 are diagrams showing the circuit according to an embodiment of the present invention.

FIG. 5 illustrates an embodiment of the present invention. The structure of FIG. 5 will be explained below. The recording circuit REC and the play-back circuit PLY in the video tape recorder VTR are provided with pick-up coils $PC_1$, $PC_2$, respectively, to detect frequency-modulated brightness signals. Signals picked up by the pick-up coils $PC_1$, $PC_2$ are input to band-pass filters 1, 5 which permit the signals of a frequency band of FM brightness signals only to pass through, and are then input to amplifier circuits 2, 6. The pick-up coils should be mounted on such positions where they can be easily detected, though the positions may differ depending upon the circuit construction of the video tape recorder, manufacture or the models, so that they can be easily mounted even at home.

Then, the outputs of the amplifier circuits 2, 6 are converted into direct currents through detector circuits 3, 7 consisting of diodes $D_1$, $D_2$ and capacitors $C_1$, $C_2$, and are then compared with predetermined reference voltages $V_{REF1}$, $V_{REF2}$ by the comparators $COM_1$, $COM_2$ in the comparator circuits 4, 8, thereby to obtain a signal $S_{REC}$ which represents the recording mode and a signal $S_{PLY}$ which represents the play-back mode.

Primary windings of current transformers $CT_1$, $CT_2$ are inserted in one of the lines between the power-source plugs and the a-c source of the video tape recorder VTR and the television set TV. The electric currents produced in the secondary windings of the current transformers $CT_1$, $CT_2$ are converted into direct currents through rectifier circuits 9, 11 consisting of diodes $D_3$, $D_4$, and capacitors $C_3$, $C_4$. Then, the waveforms are shaped through comparators $COM_3$, $COM_4$ of comparator circuits 10, 12, and are synthesized with the signals $S_{REC}$, $S_{PLY}$ through a gate circuit 13, to obtain a signal $S_{MON}$ which represents the monitor mode. When none of the signals $S_{REC}$, $S_{PLY}$ and $S_{MON}$ exist, this indicates the off mode. Here, no signal is taken out to represent the off mode.

In the recording condition, the recording circuit REC operates in the video tape recorder VTR, and an FM brightness signal is detected by the pick-up coil $PC_1$. Therefore, a signal of high level is applied to the input terminal of comparator $COM_1$ of the comparator circuit 4 via the band-pass filter 1, amplifier circuit 2 and detector circuit 3, whereby the comparator $COM_1$ is inverted, and the signal $S_{REC}$ assumes high level to represent the recording mode.

In the play-back condition, similarly, the FM brightness signal regenerated from the magnetic tape is detected by the pick-up coil $PC_2$. Therefore, a signal of the high level is input to the input terminal of the comparator $COM_2$ of the comparator circuit 8 via the band-pass filter 5, amplifier circuit 6 and detector circuit 7, whereby the comparator $COM_2$ is inverted to produce the signal $S_{PLY}$ of the high level which represents the play-back mode.

Figure 6:
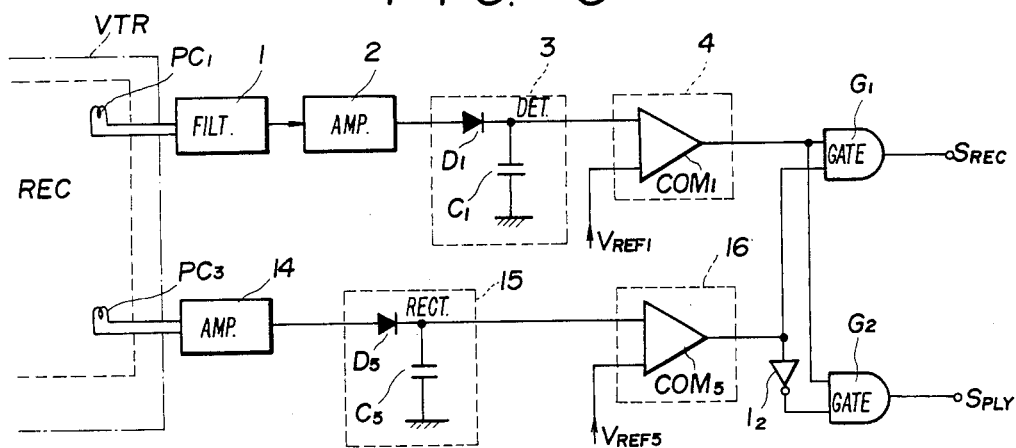

FIG. 6 shows a modified example of the above-mentioned circuit, and more particularly shows a detection method when the recording circuit and the play-back circuit of the video tape recorder are close to each other, and FM brightness signals to be recorded and FM brightness signals to be regenerated are not separated from each other. Here in, a pick-up coil $PC_3$ is provided to detect an erase signal that generates at the time of recording. This detected signal is converted into a logic level via an amplifier circuit 14, a rectifier circuit 15 and a comparator circuit 16, and then a signal $S_{REC}$ which represents the recording mode and a signal $S_{PLY}$ which represents the play-back mode are obtained by a logic circuit consisting of AND gates $G_1$, $G_2$ and an inverter $I_1$. Here, the structure for detecting the monitor mode is the same as that of FIG. 5.

Figure 7:
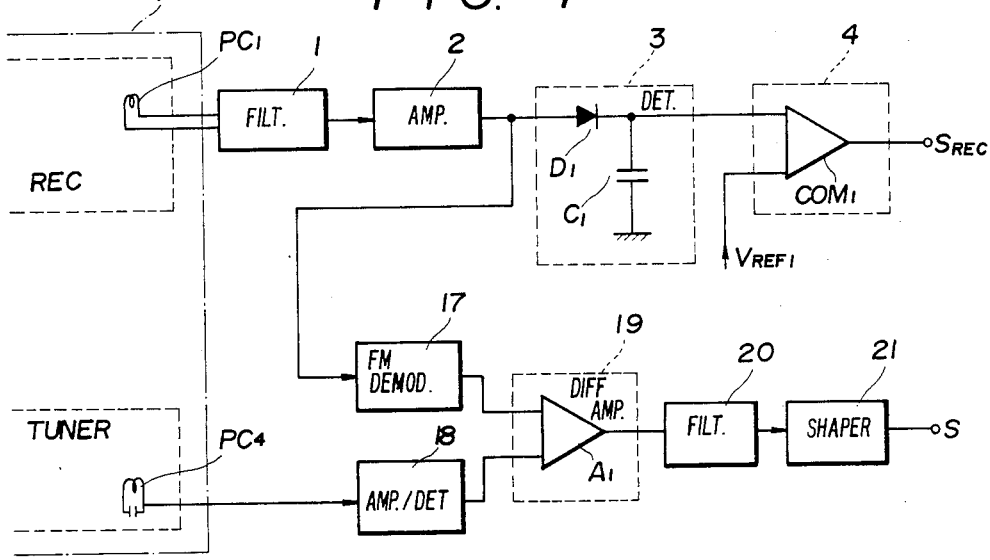
FIGS. 7 to 10 are diagrams showing circuit according to further embodiments of the present invention.

FIG. 7 shows a second embodiment which is an expansion of the above-mentioned technique, and which has a function to determine the recording of an ordinary program on the air and the dubbing (which makes use of another video tape recorder, and records a program that has once been recorded in the tape). That is, according to the second embodiment, the FM brightness signals detected from the recording circuit of the video tape recorder VTR are demodulated to obtain video signals. The video signals are then directly compared with the video signals of a program being received by the tuner of the video tape recorder VTR, to determine whether the signals are the same or not.

An output signal (FM brightness signal) of the amplifier circuit 2 is converted into a video signal via the FM demodulator circuit 17, and a video intermediate-frequency signal detected from the tuner of the video tape recorder VTR via the pick-up coil $PC_4$ is converted into a video signal via a video intermediate-frequency amplifier/detector circuit 18. These signals are directly compared with each other by the amplifier $A_1$ of a differential amplifier circuit 19, and are passed through a filter 20 and a waveform shaping circuit 21 to obtain a signal S which indicates whether these two signals are in agreement with each other or not.

However, the tuner of the video tape recorder VTR is always receiving the broadcast which is set by a manual dial or by a touch channel, irrespective of the condition of recording, and video signals have always been applied to a terminal of the differential amplifier circuit 19 via the video intermediate-frequency amplifier/detector circuit 18. In this case, if the video tape recorder assumes the condition of recording, video signals written onto the magnetic tape are also applied to the differential amplifier circuit 19 from the pick-up coil $PC_1$ via the band-pass filer 1, amplifier circuit 2, and FM demodulator circuit 17, and signals components of these signals are compared (subtracted). If the program being recorded is the one on the air, these signals are the same, and the differential amplifier circuit 19 produces an output which assumes the low level in average. In the case of dubbing, these signals do not agree with each other, and the differential amplifier circuit 19 produces a wave form of a large amplitude. Therefore, depending upon the signal S under the condition where the signal $S_{REC}$ representing the recording mode is assuming the high level, whether it is the recording of a program on the air or the dubbing can be determined.

Figure 8:
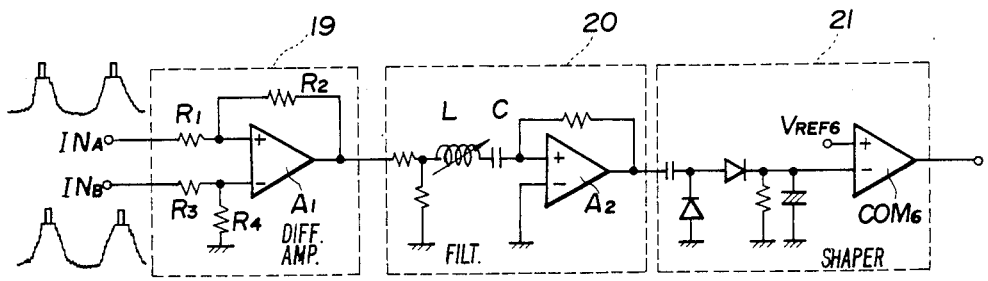

FIG. 8 concretely illustrates the differential amplifier circuit 19, filter 20, and waveform shaping circuit 21 that are shown in FIG. 7, and that constitute a so-called high-frequency comparator circuit. The differential amplifier circuit 19 is constituted by an amplifier $A_1$ such as an operational amplifier. By suitably setting the resistances $R_1$ to $R_4$, the output of the differential amplifier circuit 19 becomes nearly zero when signals of the same level are applied to the signal input terminals $IN_A$, $IN_B$. Though it is difficult to have the two input signals assume completely the same level through the circuits of preceding stages, the difference therebetween can be reduced to a negligibly small value by squeezing the gain of the differential amplifier circuit 19. Then, a band-pass active filter 20 is constituted by an amplifier $A_2$ and a series resonance circuit consisting of an inductance L and a capacitor C. The filter 20 takes out only the signals near a frequency (in Japan, for instance, 15.75 kHz) corresponding to horizontal synchronizing signals in the video signals. Here, the frequency is limited to that of horizontal synchronizing signals. This is because an electric power spectrum of horizontally synchronizing signals is contained in the video signals even when any image is appearing on the screen, making it possible to stably compare the output signal of the differential amplifier circuit 19 with the reference level $V_{REF6}$ in the subsequent waveform shaping circuit 21 while suppressing variation, and to determine whether they are in agreement with each other or not. For instance, if the signal is directly compared with the reference level $V_{REF6}$ in the waveform shaping circuit 21 without providing the filter 20, the output signal of the differential amplifier circuit 19 vibrates greatly depending upon the picture, in case dissimilar signals (video signals) are applied to the signal input terminals $IN_A$, $IN_B$. However, whether the video signals of two broadcasts are the same or not can be learned if discrepancies of the horizontal synchronizing signals are determined. For this purpose, the horizontal synchronizing signals only are extracted by the filter 20 and are converted into a direct current to obtain signals having a predetermined difference of level depending upon whether the broadcasts are the same or not.

Figure 9:
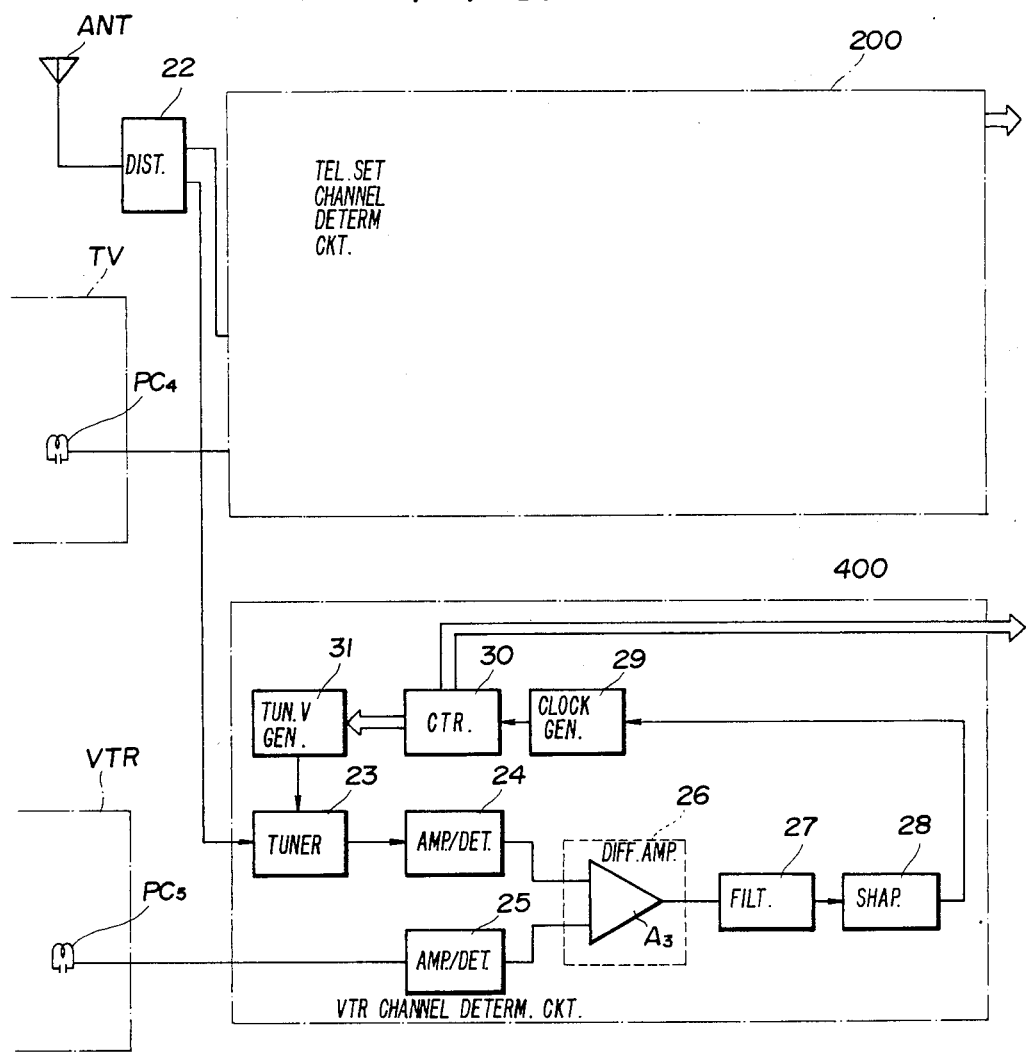

FIG. 9 shows a third embodiment in which the invention is adapted to determine the channel of the television set or the video tape recorder by further expanding the comparison of the video signals. Namely, this embodiment corresponds to the television set channel determining circuit 200 and the video tape recorder channel determining circuit 400 of FIG. 1. The circuit blocks surrounded by dot-dash chain lines are quite equal to each other, and one of them is therefore not diagrammed. The following description deals with the video tape recorder channel determining circuit 400.

The video tape recorder VTR is equipped with a pick-up coil $PC_5$ which detects video intermediate-frequency signals and which is connected to one terminal of an amplifier $A_3$ in a differential amplifier circuit 26 via a video intermediate-frequency amplifier/detector circuit 25. The differential amplifier circuit 26 is further served, through its other terminal, with signals that are sent, through a video intermediate-frequency amplifier/detector circuit 24, from a tuner 23 that is independently receiving the broadcast, i.e., receiving antenna signals from a distributor 22. Then, the output of the differential amplifier circuit 26 is input to the control input terminal of a clock generator 29 via a filter 27 and a waveform shaping circuit 28. The output signal of the clock generator 29 is input to the clock input terminal of a counter 30. The voltage of a tuning voltage generating circuit 31 is controlled by a binary output of the counter 30, and a voltage for selecting the broadcasting station is applied to the tuner 23. Here, it need not be pointed out that the differential amplifier circuit 19, filter 20 and waveform shaping circuit 21 shown in FIG. 8 are utilizable as the differential amplifier circuit 26, filter 27 and waveform shaping circuit 28 of this embodiment.

However, when the two signals input to the differential amplifier circuit 26 are not in agreement with each other, a signal of the high level is applied to the clock generator 29 via the filter 27 and the waveform shaping circuit 28, whereby the clock generator 29 continues to generate the pulses, and the counter 30 continues to step up. The tuning voltage generating circuit 31 which operates upon receipt of a binary output of the counter 30, works to successively switch the channels of VHF and UHF according to a predetermined order.

The switching of channel is continued until the two signals come into agreement with each other, i.e., until the tuner 23 selects the station of the channel same as that of the video tape recorder VTR. Therefore, when the output of the waveform shaping circuit 28 constantly assumes the low level, the binary output of the counter 30 represents a channel data.

Figure 10:
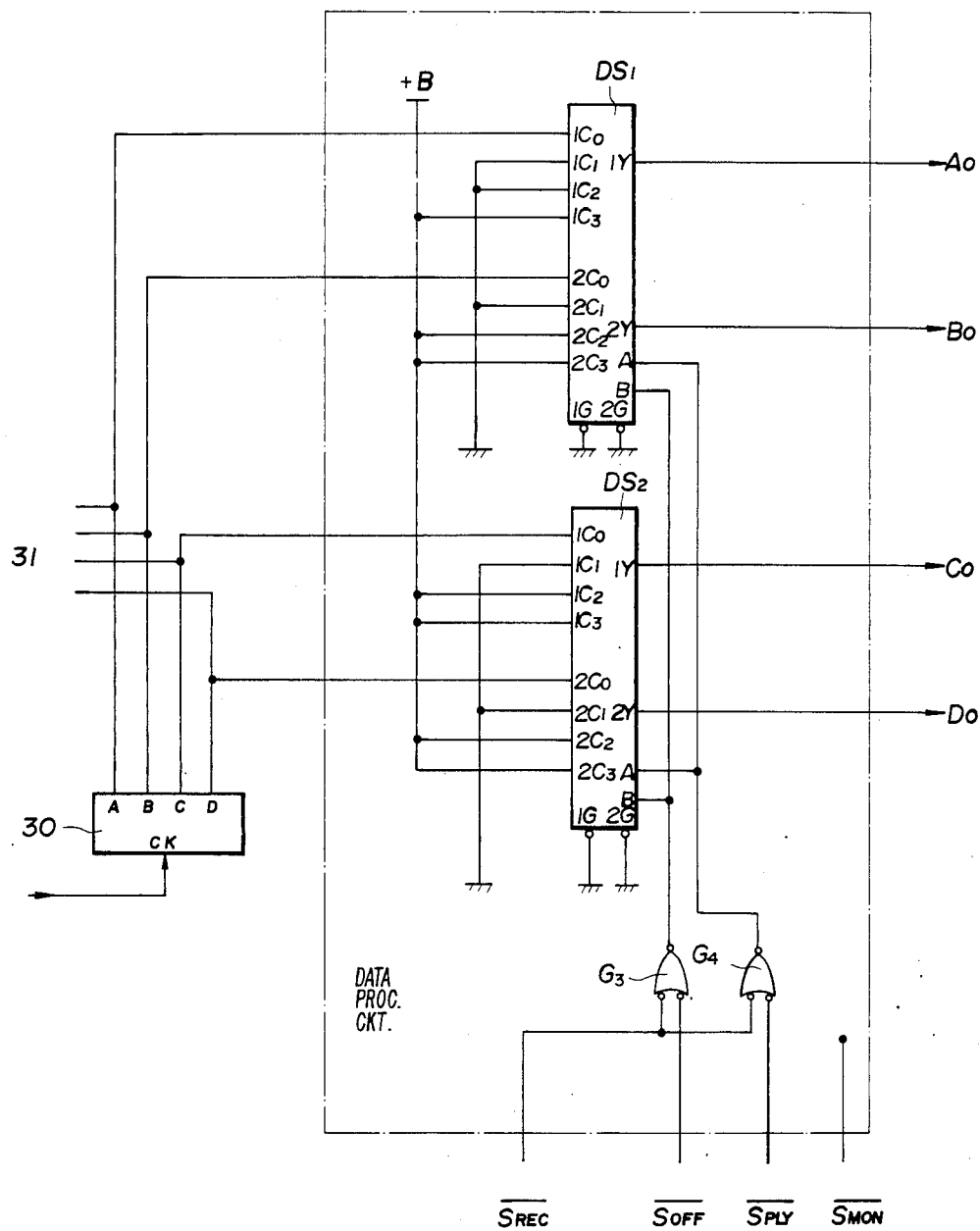

FIG. 10 illustrates a concrete circuit structure of a data encoder which synthesizes and encodes the channel which is the data of the video tape recorder and the data of the operation mode. The data encoder corresponds to a portion of the data processor circuit 600 which is shown in FIG. 1.

The circuit consists of gates $G_3$, $G_4$ and data selectors $DS_1$, $DS_2$ (e.g., 74LS153 of TTL-IC). Here, for the purpose of convenience, signals $R_{REC}$, $(S_{OFF})$, $S_{PLY}$, and $S_{MON}$ that represent the operation conditions and that are produced by the video tape recorder operation condition detector circuit 300 are expressed in terms of negative logic. To couple the circuit with the circuits of FIGS. 5 to 7, inverters should be inserted therebetween.

The data selectors $DS_1$, $DS_2$ have truth values as shown below. Namely, depending upon the combinations of select inputs A, B from the gates $G_3$, $G_4$, the signals applied to the terminals $C_0$ to $C_3$ are transferred to the output Y.

| B | A | Y |
|---|---|---|
| L | L | $C_0$ |
| L | H | $C_1$ |
| H | L | $C_2$ |
| H | H | $C_3$ |

Relations between the signals $A_0$, $B_0$, $C_0$, $D_0$ produced by the circuit of FIG. 10 and the data are tabulated below.

| $A_0$ | $B_0$ | $C_0$ | $D_0$ | Station and operation mode |
|---|---|---|---|---|
| L | L | L | L | off mode |
| H | L | L | L | ○ ○ broadcasting station |
| L | H | L | L | X X broadcasting station |
| H | H | L | L | △ △ broadcasting station |
| L | L | H | L | ○ X broadcasting station |
| H | L | H | L | X ○ broadcasting station |
| L | H | H | L | X △ broadcasting station |
| H | H | H | L | △ X broadcasting station |
| L | L | L | H | ○ △ broadcasting station |
| H | L | L | H | △ ○ broadcasting station |
| L | H | L | H | □ □ broadcasting station |
| H | H | L | H | □ — broadcasting station |
| L | L | H | H | — — broadcasting station |
| H | L | H | H | — □ broadcasting station |
| L | H | H | H | play-back mode |
| H | H | H | H | monitor mode |

The recording mode is not shown in the above table. It will, however, be obvious that the data of any channel is recorded if such data exist. Although the number of channels that can be determined is 13 stations in the above table, the number of channels can be increased as required, as a matter of course, by increasing the bit number of the counter and the number of inputs of the data selector.

What is claimed is:

1. An audience rating measuring system for use with a video tape recorder including a recording circuit, a playback circuit, and a power source and which is characterized by off mode, monitor mode, play-back mode and recording mode and for use with a television set including a power source, said system comprising: record detection means which detects frequency-modulated video signals from the recording circuit of said video tape recorder and which converts the video signals into direct currents;

play-back detection means which detects frequency-modulated video signals from the play-back circuit of said video tape recorder and which converts the video signals into direct currents;

power-source detection means which detects the turning on and off of the power source of said video tape recorder and of said television set; and circuit means coupled to said record detection means, play-back detection means, and power-source detection means for detecting the operation of the video tape recorder, to determine whether the operation condition of the video tape recorder is in said off mode, monitor mode, play-back mode or recording mode.

2. An audience rating measuring system for use with a video tape recorder including a recording circuit and a tuner and which is c characterized by ordinary broadcast and dubbing modes and with a television set, said system comprising:

record detection means which detects frequency-modulated video signals from the recording circuit of said video tape recorder and which converts the video signals into direct currents;

FM demodulation means which demodulates said frequency-modulated video signals to obtan video signals;

detection means which detects video intermediate-frequency signals from the tuner of said video tape recorder to obtain video signals;

comparator means which directly compares the video signals obtained from said FM demodulation means with the video signals obtained from said detection means to determine whether they are in agreement; and circuit means coupled to said detection means and comparator means and which determines whether a record is of said ordinary broadcast or dubbing modes, relying upon the detection conditions of said record detection means and said comparator means.

* * * * *